Figure 1:
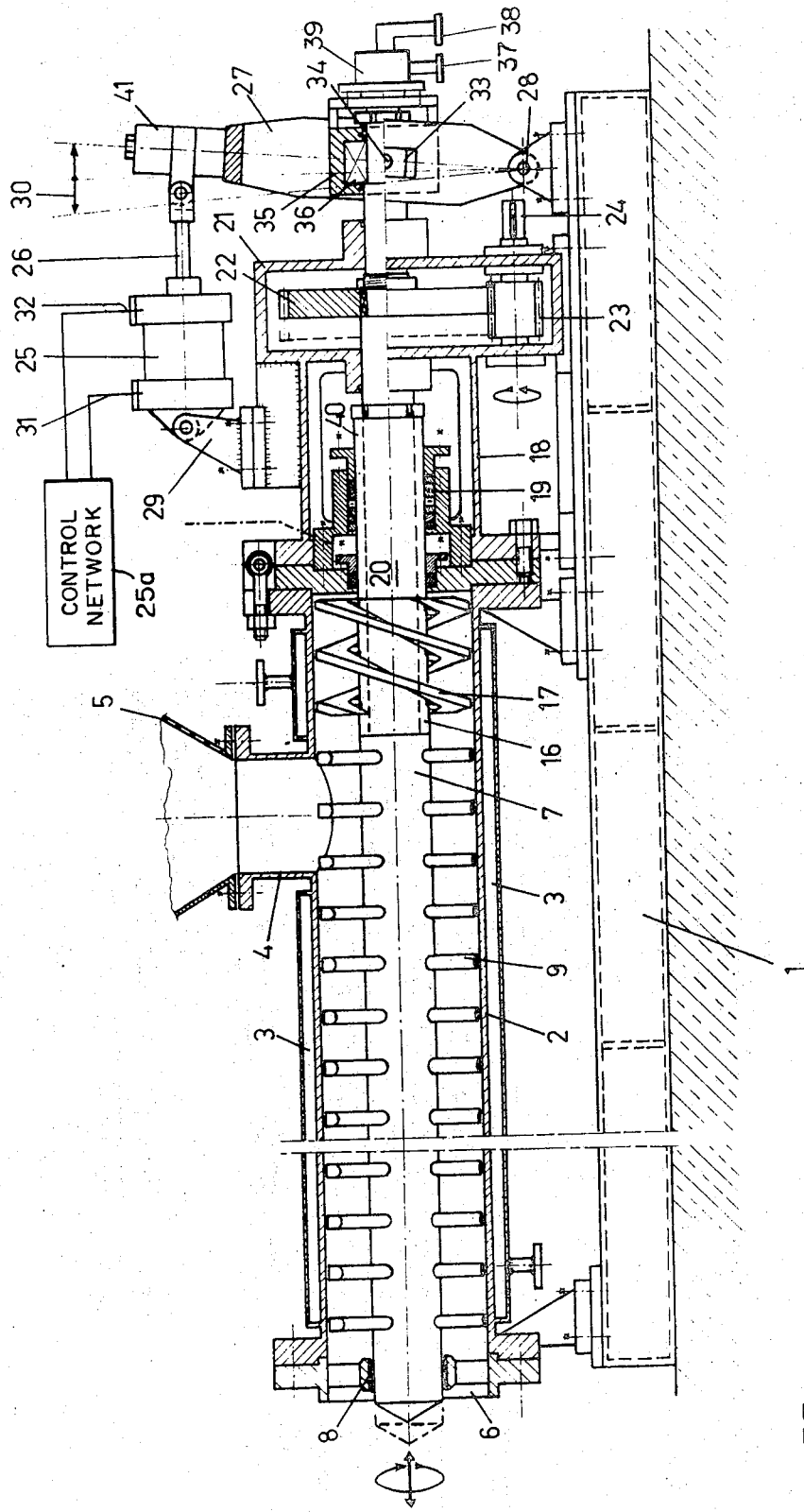

United States Patent
Sutter et al.

[11] 3,776,529
[45] Dec. 4, 1973

[54] PROCESS FOR THE DOSABLE CONVEYING OF MATERIALS AND DEVICE FOR CARRYING OUT THE PROCESS

[75] Inventors: Fritz Sutter; Fritz Ronner, both of Pratteln, Switzerland

[73] Assignee: Buss Ltd., Basle, Switzerland

[22] Filed: Aug. 30, 1971

[21] Appl. No.: 176,112

[30] Foreign Application Priority Data
Sept. 1, 1970   Switzerland........................ 13131/70

[52] U.S. Cl. .................................. 259/185, 259/113
[51] Int. Cl. ....... B01f 7/04, B29b 1/06, B01f 11/00
[58] Field of Search .................... 259/5, 9, 10, 112, 259/113, 191, 192, 193, 185

[56] References Cited
UNITED STATES PATENTS
3,301,138   1/1967   Cox................................. 259/10 X
3,583,679   6/1971   Godley et al. .......................... 259/5
3,618,903   11/1971  Ronner et al. ....................... 259/5 X Primary Examiner—Wayne A. Morse, Jr.
Assistant Examiner—Alan I. Cantor
Attorney—Stepno & Neilan

[57] ABSTRACT

A process and apparatus for conveying and dispensing in uniform volumetric doses particulate or highly viscous materials by rotating and axially reciprocating a shaft, having radially extending paddles, within a cylindrical casing. The forward stroke of the shaft is faster than the backward stroke resulting in a net flow producing a dosable conveyance of the material through the casing. Baffles extending inwardly from the casing cooperate with the paddles to agitate and knead the material and to clean the shaft and paddles during operation.

7 Claims, 4 Drawing Figures

INVENTORS
FRITZ SUTTER
FRITZ RONNER

BY STEPNO AND NEILAN
ATTORNEYS

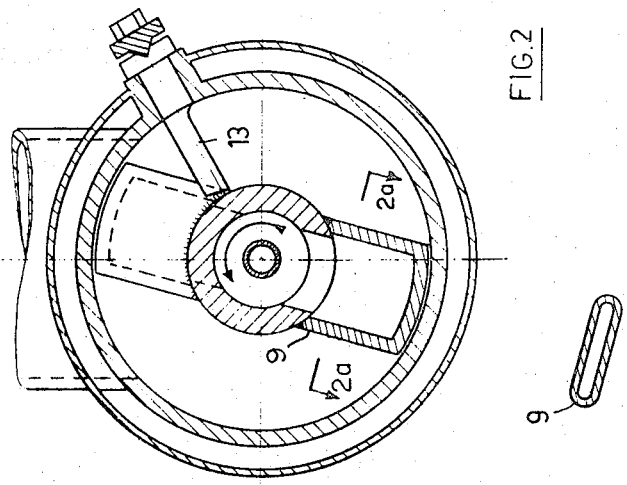
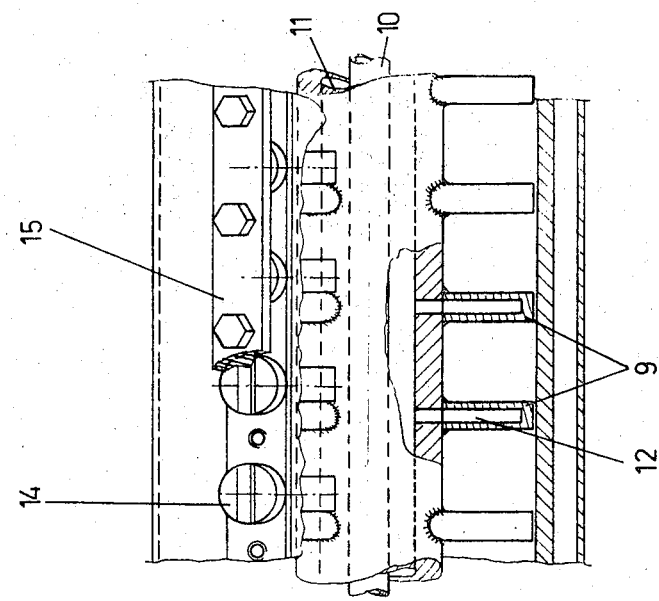

PROCESS FOR THE DOSABLE CONVEYING OF MATERIALS AND DEVICE FOR CARRYING OUT THE PROCESS

The present invention refers to a process for the volumetrically dosable conveying of granular, crumbly to plastic, pasty or highly viscous materials by means of a mixing and kneading device which exhibits in a casing a rotatable shaft which can be simultaneously moved back and forth and which carries agitating and kneading organs that work together with kneading baffles arranged in the casing. For the rotary motion on the one hand and for the back-and-forth motion on the other, driving means are provided which are independent of each other.

In the treating of mixtures or of chemical intermediate products, the problem often exists that they either tend strongly to segregate in conveying or that they are not converted to a conveyable piece size through proper size reduction; sticky pastes constitute a particularly difficult conveying problem as well. Furthermore, difficulties occur in the volumectric dosing of fine-grained products in that gas or air inclusions are often released, causing severe volume changes. It is a prerequisite of volumectric dosing, however, that either changes in the condition of the products being conveyed remain in a constant relationship to the dosing rate, or that the dosing device be adjusted to the changes occurring. It is further important that the dosing device operate in self-cleaning fashion; otherwise the danger of baking-on exists, which, as is known, can render screw conveyors completely ineffective.

According to the invention, a process is proposed for volumetrically dosable conveying as described above, which is characterized by the fact that the forward stroke of the shaft, which is faster than the backward stroke, generates in the material in the mixing and kneading casing a cylindrical flow which dominates with respect to the flow generated by the backward stroke, and the rotating of the shaft, and which makes possible a dosable conveying of the material.

Advantageously, the material throughput rate and the average residence time can be steplessly adjustable through changing the number of strokes per unit time and/or the stroke speed.

The device for carrying out the process consists of a mixing and kneading device exhibiting in a casing a rotatable shaft which can be simultaneously moved back and forth and which carries agitating and kneading organs as conveying organs that work together with kneading baffles arranged in the casing, whereby for the rotary motion on the one hand and for the back-and-forth motion on the other, driving means are provided which are independent of each other. According to the invention, a gear unit is provided for driving the shaft in rotation which possesses a gear wheel which is able to move axially together with the shaft and which is able to shift axially with respect to a driving pinion, while the axial back-and-forth motion of the shaft is accomplished by means of a hydraulic or pneumatic piston drive which is governed by a control arrangement for affecting the number and the speed of the forward and backward motion.

Advantageously, a full rotation of the shaft takes place both at the foremost and rearmost end positions of the stroke, whereby the paddles are wiped at every single stroke during the interruption of the stroke. The control arrangement regulates the number of rotations per stroke in such a way that the root of the shaft lying between the paddles is cleaned by wiping baffles, whereby the edges of the paddles clean the inside wall of the casing lying between the wiping baffles.

The conveying rate even remains constant if the products lose considerable volume through escape of gases or evaporation, since the effective conveying surface of the paddles drops proportionally to the drop in the degree of filling.

The attached drawing represents an execution example of the device according to the invention. The figures show:

FIG. 1 a vertical section through the device,
FIG. 2 a cross-section in the area of the paddles,
FIG. 2a a cross-section taken along line 2a — 2a of FIG. 2, and
FIG. 3 a detail referring to FIG. 1.

The mixing and kneading device is arranged on a support 1; it exhibits a cylindrical mixing and kneading casing 2 which is equipped with a heating and/or cooling jacket 3. At one end of the casing an infeed connection 4 with feed hopper 5 is provided for the material to be processed, while the finished product leaves the casing through the axial discharge connection 6 at the other end of the casing 2. Inside casing 2, a mixing and kneading shaft 7 is arranged able to be rotated and able to be shifted axially somewhat, in that it can be moved from the illustrated position to that indicated by the broken line at the left-hand end. The shaft 7 is supported at its end in the neighborhood of the discharge connection 6 by a support bearing 8 and is equipped with paddles 9, the design and arrangement of which can be seen in more detail in FIG. 2 and 3. The paddles 9 are constructed hollow and exhibit a flattened profile as illustrated in FIG. 2a.

The inside of shaft 7 is provided with a central tube 10 for the introduction of a heating or a cooling medium, this tube being connected to a return line 11 through which the heating or cooling medium is removed. It is also possible to arrange a number of return lines 11 around the tube 10, which are connected to the hollow interiors 12 of the paddles 9, so that the paddles can be heated or cooled in this way.

For the cleaning of the paddles 12, inserted in the casing wall are wiping baffles 13 which are shaped like spikes and are fastened by means of a head 14. To locate the baffles radially and to secure them against turning, a mounting strip 15 is arranged running lengthwise along the casing. It should be noted that the wiping baffles are not shown in FIG. 1, so as not to impair the clarity of that illustration. Located ahead of the infeed connection 4, an exchangeable sleeve 16 with screw 17 is arranged on the shaft 7. Further, on the drive end of the shaft, a seal 19 similar to a stuffing box and a bearing 20 are provided in the stuffing box assembly 18. Flanged to the stuffing box assembly 18 is a gear unit with gear box 21, containing a gear wheel 22 which is keyed to the shaft. The gear wheel 22 meshes with a pinion 23, the shaft 24 of which is turned by a gear motor which is not illustrated. The arrangement is made in such a way that the gear wheel 22 is able to shift axially with respect to the pinion 23.

To move the shaft 7 axially back and forth, a pneumatic or hydraulic driving device is provided, which possesses a cylinder with working piston (not shown) arranged in a housing 25. The working cylinder is provided with a piston rod 26, which is connected on its end away from the cylinder to a swivel-mounted clevis 27. The two legs of the clevis are supported at 28, and the housing 25 is also swivel-mounted in a bracket 29, so that the back-and-forth movement of the piston rod 26 causes a swivelling of the clevis 27, as indicated by the broken line and by arrow 30. It should also be mentioned that the cylinder in the housing possesses at each end a line 31 and 32 for a pneumatic or hydraulic medium, these lines being connected to a control arrangement shown diagrammatically as block 25a. Control network 25a may include any of various conventional valves and control mechanisms interconnected to perform the desired control sequence outlined herein and will not be described in detail for the sake of brevity. By way of example, reference is made to U.S. Pat. No. 3,618,903, which illustrates one type of control mechanism which may be utilized in connection with the present invention.

The legs of the clevis 27 are connected to the drive end of the shaft by means of slide rings 33 and crosspins 34; the slide rings are located in an enclosure 35 of an axial bearing 36. The free end of the shaft which extends out of the bearing 36 is provided with a stuffing box 39 with connections 37 and 38 for the tube 10 and return lines 11.

The sleeve 16 and an exchangeable jacket piece 40 which carries the stuffing-box seal 19, the gear wheel 22 as well as the axial bearing 36 and the stuffing box 39 describe both the rotating motion and the back-and-forth motion together with the shaft 7. At the same time, external air is prevented from penetrating into the mixing and kneading casing 2.

In operation, the forward stroke of the shaft in the conveying direction is fast and the back stroke in the opposite direction is slow. This is achieved by corresponding operation of the cylinder located in the housing 25, in that the appropriate amount of air or liquid is regulated through the lines. In this way, a cylindrical-flow effect occurs in the conveying direction and the material being processed is pushed toward the discharge connection 6. The material that has become deposited on the cylindrical external surfaces of the shaft, and the material sticking to the broad surfaces of the paddles 9, is wiped off by the wiping baffles 13. Following the rapid motion of the piston rod 26 in the conveying direction, it remains stationary for a certain time at the end of the stroke and then descirbes a slow return movement in the direction opposite to the conveying direction. After a short pause, the rapid motion in the conveying direction takes place again.

It should be noted that the transmission linkage between the piston rod 26 and the head 41 of the clevis 27 contains two possibilities for adjustment. When the connecting point of the piston rod 26 is shifted upward or downward, the stroke becomes longer or shorter, assuming that the movement of the piston rod remains the same. If the casing 2 and the shaft 7 expand by different amounts at elevated temperature, the stroke movement can be re-adjusted by altering the distance between the piston rod 26 and the head 41 of the clevis 27. In this way, the narrow clearance between the wiping baffles and the shaft paddles can always be maintained.

The paddle form described in the execution example can also be modified in known fashion, for example with a knife edge in the direction of rotation. It should also be noted that the arrangement of the bearings 8 and 20, and also of the stuffing box 18, can be executed in different fashion.

We claim:

1. Apparatus for conveying and dispensing in uniform volumetric doses particulate and highly viscous materials comprising a clyindrical housing having an inlet and an outlet, a shaft mounted for rotation and axial reciprocation in said housing, a plurality of mixing and kneading paddles extending radially from said shaft at longitudinal spaced points therealong, each of said paddles disposed parallel to a plane normal to the axis of said shaft and extending within close proximity to the interior surface of said housing for scraping the same clean during operation, a plurality of baffles fixedly secured to and extending inwardly from said housing at points spaced longitudinally therealong, means connected with said shaft for rotating the same, and means independent of said rotating means connected with said shaft for axially reciprocating the same independently of the rotary position thereof, said reciprocating means moving said shaft between retracted and extended positions at which said baffles cooperate with said paddles to wipe the same clean of the materials being dispensed.

2. The invention as recited in claim 1 wherein each of said baffles comprises an elongated main body member having a scraping edge formed at its distal end, and wherein said housing defines a plurality of spaced holes through the cylindrical wall thereof for supporting said baffles at the proximal ends thereof.

3. The invention as recited in claim 2 wherein said baffles are removable from the exterior of said housing and are held in place by a common mounting strip removably secured longitudinally of said housing.

4. The invention as recited in claim 1 wherein said shaft is hollow, and wherein each of said paddles comprises a hollow, generally rectangular plate having its distal end curved coaxially with said shaft to conform to the cylindrical interior of said housing, the interior of each of said hollow plates communicating with the interior of said hollow shaft.

5. A process for conveying and dispensing in uniform volumetric doses particulate and highly viscous materials comprising the steps of:
 placing the materials into a cylindrical housing at an inlet end thereof, said housing having a plurality of fixed baffles disposed therein;
 rotating a shaft disposed in said housing and having a plurality of generally flat paddles extending radially therefrom parallel to a plane normal to the axis of said shaft, said paddles and said baffles cooperating to mix and knead the materials;
 reciprocating said shaft independently of said rotating step such that the forward stroke thereof is effectuated at a rate of travel greater than that of the rearward stroke to produce plug flow of the mixed and kneaded materials from the outlet end of said housing in uniform volumetric doses.

6. The method as recited in claim 5 wherein said reciprocating step includes positioning said paddles adjacent said baffles whereby collected material is wiped from said paddles by said baffles as the shaft rotates.

7. The method as recited in claim 5 further including adjusting the size of the output dose by independently preselecting the rate of rotation of said shaft, the number of strokes per unit time of said shaft and the shaft stroke speed.

* * * * *